May 16, 1939.  B. WALKER  2,158,736
LOCKING APPARATUS FOR VEHICLE BODY DOORS
Filed May 20, 1931  3 Sheets-Sheet 1
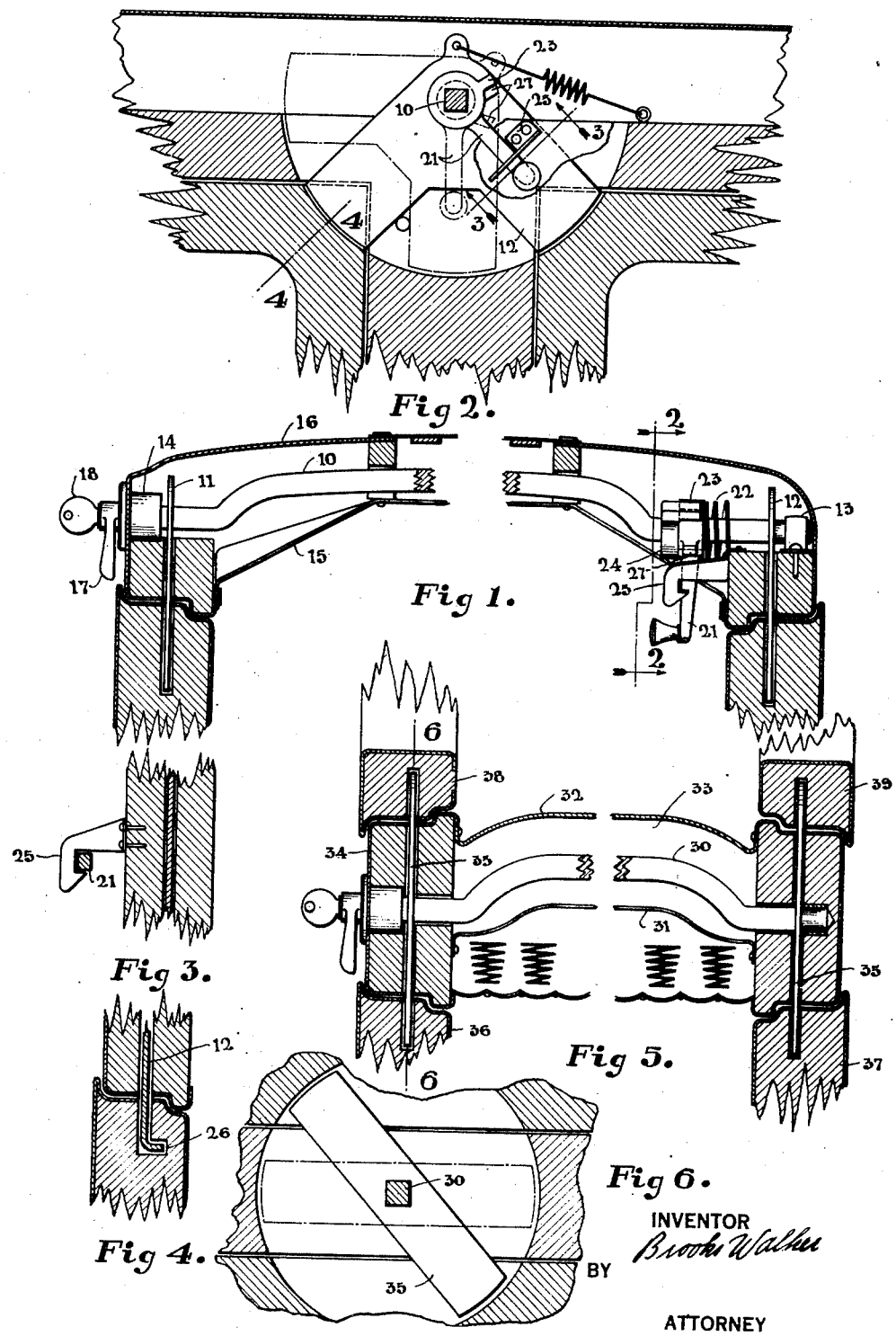
INVENTOR
Brooks Walker
BY
ATTORNEY

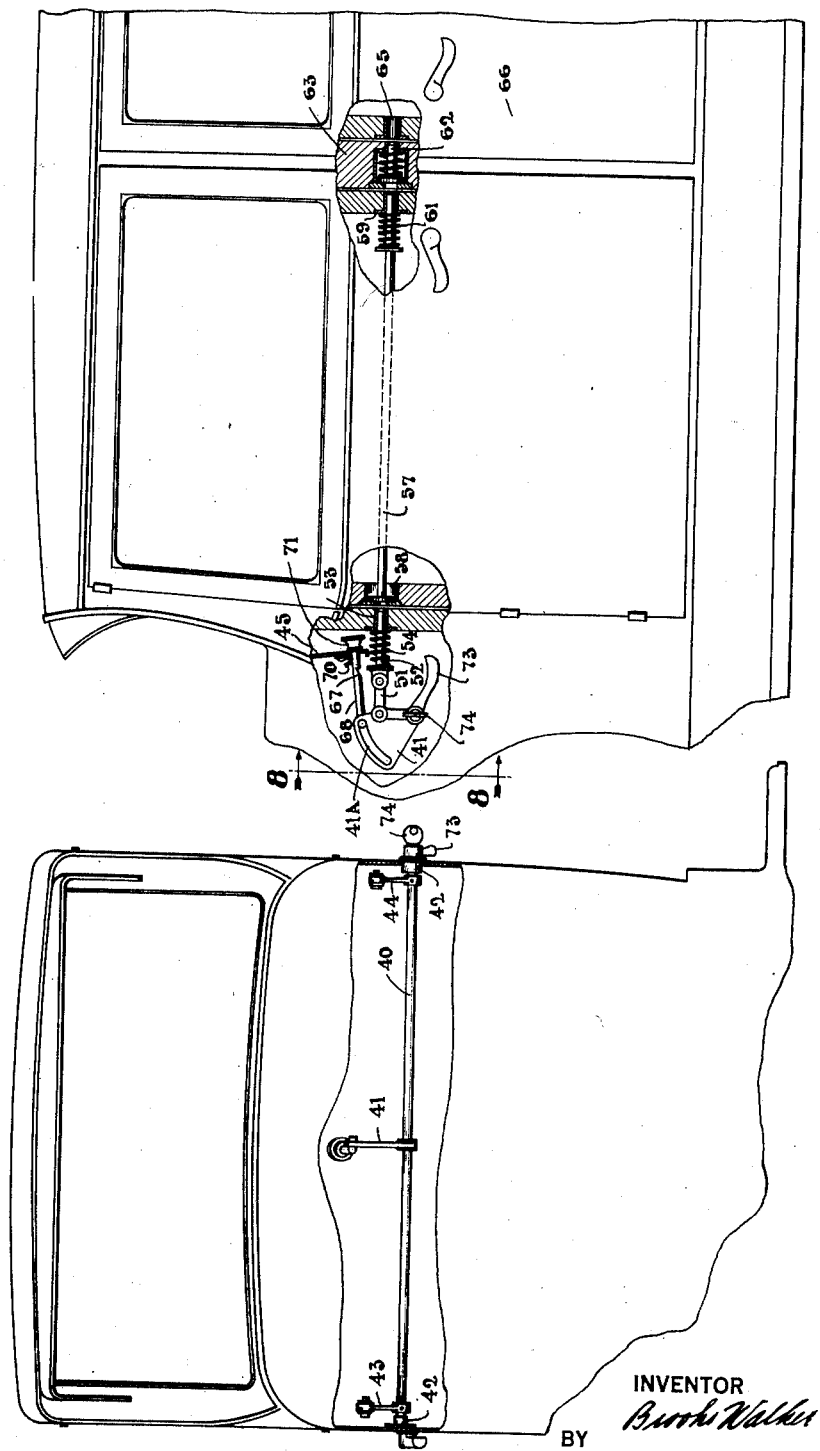

May 16, 1939.  B. WALKER  2,158,736
LOCKING APPARATUS FOR VEHICLE BODY DOORS
Filed May 20, 1931  3 Sheets-Sheet 3
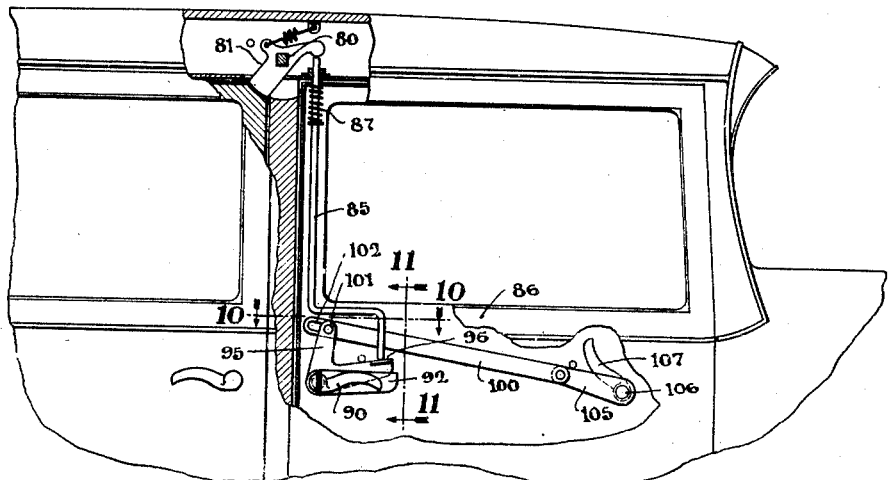
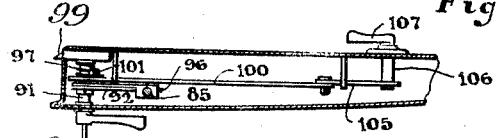
Fig 9.
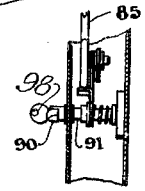
Fig 11.
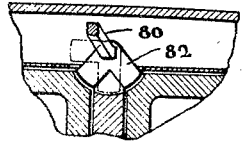
Fig 10.
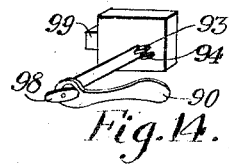
Fig 12.   Fig. 14.
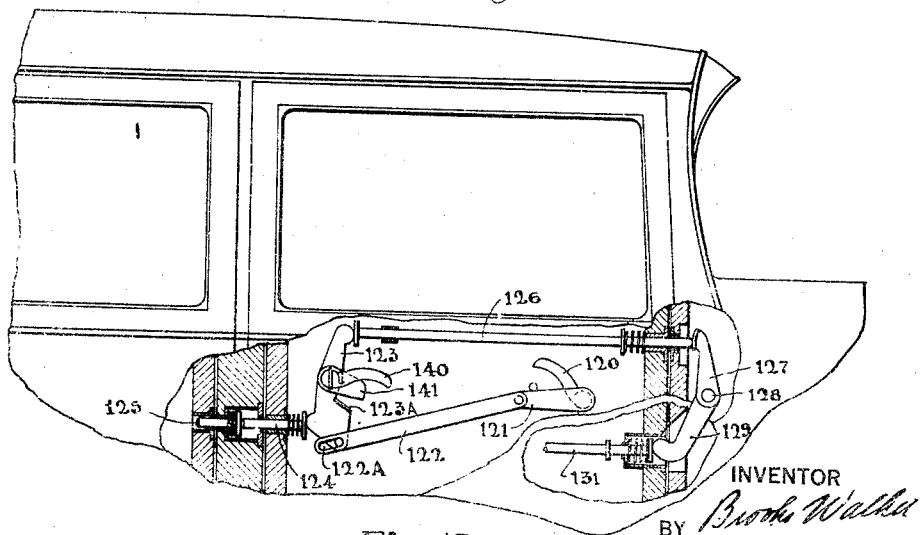
Fig 13.
INVENTOR
BY Brooks Walker
ATTORNEY Patented May 16, 1939

2,158,736

UNITED STATES PATENT OFFICE 2,158,736

LOCKING APPARATUS FOR VEHICLE BODY DOORS

Brooks Walker, Piedmont, Calif.

Application May 20, 1931, Serial No. 538,728

22 Claims. (Cl. 70—264)

This invention relates to vehicle bodies, and particularly pertains to locking apparatus for simultaneously locking all the doors of the vehicle body by a single control means, from within the vehicle to prevent access from the exterior or by a single control means from the exterior thereof associated with a locking means of the key or combination type.

I am aware that heretofore locking apparatus has been provided for simultaneously locking all the doors of the vehicle body from the exterior thereof by a key controlled means, such as is described in my copending application entitled "Locking apparatus for sedan bodies for automobiles" filed July 17, 1929, Serial No. 378,863, now matured into Patent No. 1,853,326, dated April 12, 1932, and in the application for re-issue entitled "Lock for multiple doors", Serial No. 442,622, filed April 8, 1930, applicant John Sandholdt, Jr. assigned in full to Brooks Walker.

It is the principal object of the present invention to provide a construction for locking all the doors from the vehicle exterior by single lock controlled means, to further provide auxiliary means whereby all of the doors may be simultaneously locked by a single control means from the vehicle interior, said interior control means incorporating many of the same elements as the exterior control means. I thereby provide assurance against unauthorized entrance from the vehicle exterior while the vehicle is locked from within or without. The inside lock further prevents the possibility of children accidentally falling out by unlatching the conventional door lock control, particularly in the rear of the car.

A further object of the present invention is to provide means whereby the ordinary door latch control means may be utilized to control the simultaneous locking of all the doors either from the interior or the exterior of said vehicle, and thereby reduce the number of exterior handles or controls necessary.

A further object is to provide improvements in locks operated from both sides in general and particularly to improve locking means for multiple doors.

Some of the forms which my invention may assume are exemplified in the following description and illustrated by way of example in the accompanying drawings, in which:

Fig. 1 is a fragmentary transverse elevation view, partly in section, showing the manner in which the bolts are associated with the vehicle body.

Fig. 2 is a fragmentary view through section 2—2 of Fig. 1 illustrating the device in its locked position in full line, and in the unlocked position in dotted line.

Fig. 3 is a fragmentary view through section 3—3 of Fig. 2 illustrating a latch mechanism that may be incorporated with the device for locking the doors from the interior.

Fig. 4 is a fragmentary view of an alternative construction of the lower edge of the bolt illustrated in Fig. 2 through section 4—4 thereof.

Fig. 5 is a broken plan view through the back of the front seat and the associated door posts and doors illustrating an alternative type of construction embodying the invention.

Fig. 6 is a fragmentary side elevation view through section 6—6 of Fig. 5 illustrating the bolt in the locked position in full lines and in the unlocked position in dotted lines.

Fig. 7 is a fragmentary broken view of the portion of a vehicle body incorporating a further construction which my invention may assume.

Fig. 8 is a fragmentary front view of a vehicle body incorporating the invention as illustrated in Fig. 7 broken through section 8—8.

Fig. 9 is a fragmentary broken view in side elevation of a vehicle body incorporating another form which my invention may assume.

Fig. 10 is a fragmentary plan view, partly in section, through section 10—10 of Fig. 9.

Fig. 11 is an elevation view, partly in section through section 11—11 of Fig. 9.

Fig. 12 is a fragmentary view, partly in section, of the locking means for the doors at the opposite side of the vehicle body, as illustrated in Fig. 9.

Fig. 13 is a fragmentary view, partly in section, of an alternative type of construction for accomplishing the result in a manner similar to that illustrated in Fig. 7 and Fig. 8, but utilizing the conventional door handles to control the device.

Fig. 14 is a fragmentary view showing one form of lock construction which may be used in connection with the exterior control for this locking device.

Referring more particularly to the accompanying drawings in which like numerals of reference refer to similar parts in the various views. In Figs. 1, 2, and 3, I have illustrated a construction similar to that illustrated in my aforementioned application with the additional means provided for locking all the doors from the interior of the vehicle. In this construction I have illustrated a cross-shaft 10 on which are mounted bolts 11 and 12 for simultaneous rotation with shaft 10, which is journalled in the vehicle body in any suitable manner, such as the bearing 13 and the lock body 14. The shaft 10 is preferably located above the door latch post and extends transversely across the body, preferably between the liner material 15 and the top material 16 and is disposed between the top bows.

In the event that the bows are arched the shaft may be formed in a similar manner since it rotates only about 45°, as illustrated in the two positions shown in Fig. 2, a placement of the arch at about 22½° from the perpendicular in both positions will require the minimum space.

The exterior handle 17 is rigidly attached to the control rod 10 and thereby controls its rotation. When rotated to the locked position, as illustrated in full line of Fig. 2, the key through the lock 14 is adapted to lock the handle 17 positively in this position, thereby locking all of the doors simultaneously from the exterior. However, in this construction the key is necessary to lock the handle in this position, as here shown, although any other suitable means may be used. The interior handle 21 is mounted for rotation on the shaft 10 and is normally held in the vertical position, as shown, by the torsion spring 22, or other suitable means. This handle 21 is provided with an extension 27 which intercepts the arm 23 of the collar 24 which is rigidly attached to the control rod 10 in such a manner that a counterclockwise rotation of the handle 21 from the dotted position of Fig. 2 to the latched position shown in full line of the same figure causes the shaft 10 to be rotated into the locked position. However, when the device is actuated by the handle 17 the arm 23 moves away from the extension 27 of the handle 21, whereby the car may be locked from the exterior without causing the arm 21 to be rotated into engagement with a keeper 25. The keeper 25 is so formed with a tapered leading edge and retaining hook in the path of normal travel of the arm 21 as to be adapted to retain the arm 21 in a locked position as shown in Figure 3. This construction is preferable because the locking of the vehicle from the handle 17 would otherwise cause the handle 21 to engage the keeper 25 and thereby prevent access to the vehicle even when the handle 17 is unlocked by the key 18.

In Fig. 3 I have illustrated a shape that the keeper 25 may assume with the handle shown in its latched position.

In Fig. 4 I have shown a modified form of bolt 12 which may be employed with the door engaging edge turned inward to further strengthen it and retain the door more securely against forced opening from the exterior. The slot 26 in the door is made preferably to coincide with the bolt contour for security.

In Fig. 5 I have illustrated a modified form of my locking device in which the cross shaft 30 is preferably carried behind the upholstery and springs of the front seat at a point in the vicinity of the usual door latching mechanism. In this case a guard 31 may be added to protect the cross shaft 30 from interference by the upholstery and springs of the front seat during its partial rotation operation. The cross shaft 30 then lies in a compartment 33 between the guard 31 and the back of the front seat 32. However, in some cases the back of the front seat may lie in front of the cross shaft 30 in a position similar to that of the guard 31, particularly in the coupe or single seat type of body, in which case there will be no necessity of providing a special compartment for the operation of the cross shaft 30. The segments 35 are rigidly mounted on the cross shaft 30 for simultaneous rotation therewith and are adapted to engage the front doors 36 and 37 of the body and at the same time engage the rear doors 38 and 39 to simultaneously lock all the doors at one time. The center post 34 supports the bearings for the cross shaft 30 and is slotted to allow the partial rotation of the locking segments 35 to the full line position shown in Fig. 6 wherein the doors are locked, or to the dotted position of the same figure when the doors are unlocked.

In Figs. 7 and 8 I have illustrated an alternative type of construction wherein a cross shaft 40 is mounted for rotation in the bearings 42 mounted in front of the vehicle instrument board 45. The arms 41, 43, and 44 are rigidly attached to the cross shaft 40. The arms 43 and 44 are connected through a suitable linkage 51 to pins 52 which are reciprocally mounted in bearings 53 and are urged to their retracted position by springs 54. These pins 52 are operatively associated with a pair of pins 57 reciprocally mounted in the front doors of the vehicle in suitable bearings 58 and 59 and are yieldably urged to their unlocked position by the spring 61. This pin 57 is likewise operatively associated with a loose pin 62 reciprocally mounted in the door post 63 in suitable bearings and adapted to engage the socket 65 of the rear door 66. The construction is similar on both sides of the car. It is to be understood that if the rear door 66 is hinged to the center post that an additional loose pin may be mounted therethrough in a manner similar to the pin 57 in the front door. A rod 68 is operatively associated with the arm segment 41 so that a rearward pull on the knob 71 will cause the partial rotation of the shaft 40 until the latching notch 67 engages the instrument board, or other suitable means, and is so retained in engagement by the spring 70. In this position the partial rotation of the cross shaft 40 will have caused a similar rotation of the arms 43 and 44 which in turn causes the pin 52 to engage the pin 57 which in turn engages the pin 62 to force them all rearward into locking engagement whereby all of the doors of the vehicle are locked since both sides of the car are symmetrically constructed.

The key controlled handle 73, at the exterior of the vehicle body, likewise controls the rotation of the cross shaft 40. However, when the notch 67 is in engagement with the instrument board 45 it cannot be forced out by the rotation of the handle 73. Nevertheless, if it be desired to lock the car from the exterior a partial rotation of the handle 73 will cause a motion of the pins 52, 57, and 62 into locking engagement without causing the rod 68 to be moved into its latched position because of the slot 41—A in the arm segment 41. A key controlled lock, or other suitable lock means, retains the handle 73 in this locked position until suitable means are used to unlock it, such as the key 74. From the foregoing it will be obvious that I have provided a means whereby a pull on a single control 71 securely locks the doors of the car against the unauthorized entrance from the exterior or from the danger of unintentional opening of the door from the conventional door latches, while at the same time I provide a single means whereby all of the doors may be locked by key controlled means from a single point on the exterior of the vehicle, so that in the event that one of the door windows is partially opened the door may not be opened by reaching through and operating the conventional latch control.

In Figs. 9, 10, 11, and 12 I have illustrated an alternative type of construction utilizing a cross shaft 80, similar in construction to cross shaft 10 in Figs. 1 and 2, and carrying bolts 81 and 82 adapted to intercept the upper corners of the vehicle doors in a manner similar to that illustrated in Figs. 1 and 2. However, in this construction a vertical rod 85 is reciprocally mounted in the front door 86 of the vehicle body and is yieldably urged into its unlatched position by the spring 87. The conventional door handle 90 is mounted on the shaft 91 for rotation relative to the door and controls the conventional door latch bolt 99 in any conventional or suitable manner, not here illustrated. The arm 92 is rigidly attached to the shaft 91 while the segment 95 is rotatably mounted on the shaft 91 and may be yieldably urged toward the arm 92 by the spring 87. The segment 95 has a turned ear 96 operatively associated with the lower end of rod 85. A link 100 is operatively associated with the segment 95 by a pin 101 operating in the slot 102 of the link. The other end of link 100 is operatively associated with the arm 105 which is rigidly attached to the interior latch control arm 107 through the shaft 106. By this construction, as illustrated, all the doors may be locked from the vehicle interior by raising the handle 107 to the past center position of the arm 105 and the link 100, which causes the counterclockwise rotation of the segment 95 to raise the rod 85 into operating engagement with the bolt 81 causing it to engage the rear door and simultaneously cause the bolt 82 on the opposite side of the vehicle to engage both the doors on that side, thereby locking all of the vehicle doors.

Likewise, if the arm 105 and the link 100 are not in the locked position a partial counterclockwise rotation of the door handle 90 will cause the arm 92 to engage the ear 96 of the segment 95 and thereby cause a vertical movement of the rod 85 to effect the actuation of all the locking mechanisms in a manner similar to that just described. However, by virtue of the slot 102 the link 100 is not forced to its past center position with respect to arm 105. A counterclockwise rotation of the handle 107 will cause the door latch bolt 99 to be retracted through the rotation of the segment 95 which intercepts the arm 92 of the shaft 91 and causes them to be rotated to retract said latch bolt.

It is to be understood that the handle 90 is locked in the raised position by suitable means, one form of which is illustrated in Fig. 14 wherein the key 98 controls the lock bolt 93 in a manner similar to present automobile practice, the bolt 93 intercepting the stop 94 to prevent the clockwise rotation of the handle 90 until the bolt 93 is retracted by the action of the key 98 in the lock cylinder of the handle 90. Similar arrangements of key controlled lock bolts and stops can be used in connection with the other constructions shown herein, the stops being properly placed to effect the correct direction of locking. From the above, it will be seen that I have provided a means whereby all the doors of the vehicle may be simultaneously locked by a single interior door latch control and similarly all the doors may be simultaneously locked by means of a single exterior door handle with suitable locking means. I have, therefore, provided a locking means for all the vehicle doors requiring no additional exterior or interior controls or control handles, thereby adding to the simplicity of operation and reducing the cost under certain circumstances.

It is to be understood that the various parts may be laterally displaced and arranged in any suitable manner to facilitate the operation of the door windows or to comply with construction requirements.

In Fig. 13 I have illustrated an alternative type of construction for accomplishing the same results as obtained in Figs. 9, 10, 11, and 12 by utilizing a mechanism of the loose pin type, similar to that illustrated in Figs. 7 and 8. In Fig. 13 the interior door latch control 120 is shown in the locked position with the arm 121 and the link 122 in their past center relation causing the segment 123 to engage the pin 124, which in turn engages the center post pin 125 to lock the two doors on the near side of the vehicle, while the upper end of the segment 123 engages the pin 126 whose motion causes a partial rotation of arm 127 which is mounted on a cross shaft 128. Arm 129 at the far side of cross shaft 128 intercepts a rod 131 in the front door at the far side of the vehicle which in turn intercepts a center post pin analogous to pin 125 on the opposite side of the vehicle in a similar manner, not here shown, to cause the simultaneous locking of all the vehicle doors. In this case I have illustrated the outside door handle 140 as operating the door latch, not here shown, by a partial counter clockwise rotation. The locking of the doors is effected by locking the handle in a lowered position wherein the arm 141 intercepts the lateral lug 123—A of the segment 123 to cause the engagement of all the locking pins 124, 125, 126, 131, etc., the slot 122—A operating in a similar manner to the slot 102 of Fig. 9.

Throughout this specification and claims the term doors when applied to vehicles refers to passenger doors and does not necessarily include such other doors as are used on vehicles.

While I have described and illustrated several embodiments of my invention it will be apparent to those skilled in the art that various changes, omissions, additions and substitutions may be made in the construction of the apparatus and that the apparatus may be put to uses other than those described without departing from the spirit of the invention as defined in the appended claims.

I claim as my invention:

1. In a lock for a pair of doors disposed side by side, a pin extending through one door adapted to engage the post between the doors, a pin in the post engageable by the first said pin and actuatable into engagement with the other door and a single control means for effecting the operation of the first mentioned pin for simultaneously locking both doors.

2. In a vehicle body having a plurality of doors with at least one of said doors disposed at each side of said body, locking means for all of said doors, interconnecting means between said locking means whereby all of said doors may be locked or unlocked simultaneously, latch bolt means for each of said doors, outside and inside latch bolt controls for each of said doors, interconnecting means between said locking means and one of said inside latch bolt controls whereby said last mentioned inside latch bolt control actuates all of the locking means to thereby lock all of said vehicle doors.

3. In a vehicle body having a plurality of doors with at least one of said doors disposed at each side of said body, locking means for all of said doors, interconnecting means between said locking means whereby all of said doors may be locked or unlocked simultaneously, latch bolt means for each of said doors, outside and inside latch bolt controls for each of said doors, interconnecting means between said locking means and one of said inside latch bolt controls whereby said last mentioned inside latch bolt control actuates all of the locking means to thereby lock all of said vehicle doors, and other control means for said interconnecting means operable from the vehicle exterior, a cylinder lock at the exterior for controlling the operation of said last mentioned exterior control means to effect the locking and unlocking of all of said vehicle doors.

4. In a vehicle body having a plurality of doors with at least one of said doors disposed at each side of said body, locking means for all of said doors, interconnecting means between said locking means whereby all of said doors may be locked or unlocked simultaneously, latch bolt means for each of said doors, outside and inside latch bolt controls for each of said doors, said controls operating independently of each other, interconnecting means between said interconnected locking means and one of said inside latch bolt controls, means whereby said last mentioned inside latch bolt control actuates all of the locking means to thereby lock all of said vehicle doors against opening by means of the said exterior latch bolt controls.

5. In a vehicle body having a plurality of doors with at least one of said doors disposed at each side of said body, locking means for all of said doors, interconnecting means between said locking means whereby all of said doors may be locked or unlocked simultaneously, latch bolt means for each of said doors, independently operable outside and inside latch bolt controls for each of said doors, interconnecting means between said locking means and one of said inside latch bolt controls whereby said last mentioned inside latch bolt control actuates all of the locking means to thereby lock all of said vehicle doors against outside opening by means of said outside latch bolt controls and against opening by the operation of any of said inside latch bolt controls other than the said one inside control.

6. A locking device for a vehicle body having at least two doors, said device including a control rod extending across the vehicle forwardly of the front doors thereof, a control handle for actuating said control rod, slidably mounted locking pins journaled in the vehicle doors operatively associated with said control rod, a single operation of said control rod actuating said locking pins to simultaneously lock both of said vehicle doors.

7. In a vehicle body having a plurality of doors with at least one door located at each side of the vehicle body, a slidable bolt journaled in the hinged edge of one of said doors and engageable with the vehicle body, lock bolt means associated with the remainder of said doors and located in a position to be actuated by said slidable bolt, and means for actuating said lock bolt so that all of said vehicle doors will be locked simultaneously.

8. In a vehicle body having a plurality of doors, latch bolt means for retaining said doors in their closed position, said doors having individual outside and inside latch bolt control handles associated therewith, supplementary locking bolts associated with each said door, interconnecting means between said locking bolts, means for actuating said interconnecting means whereby all of said locking bolts will be operated in unison from the vehicle exterior and from the vehicle interior, said actuating means being operated by means of said outside or inside latch control handle.

9. In an enclosure having a plurality of doors with at least two opposed doors, lock bolt means associated with each of said doors, means interconnecting all of said lock bolt means whereby they will be operated in unison, means operable from the exterior of said enclosure for controlling said interconnecting means, means operable from the interior of said enclosure for controlling said interconnecting means, latch bolt means associated with each of said doors, inside and outside latch bolt control means on each of said doors, interconnecting means between one of said latch bolt control means and the interconnecting means for said lock bolt means, said interconnecting means co-acting so that said last mentioned inside latch bolt control means controls the unlocking of said lock bolt means.

10. In a door locking mechanism having a handle on each side of said door for operating said mechanism, means for connecting said handles to said mechanism including a pair of toggle arms connected to said locking mechanism and to one of said handles, said last mentioned handle actuating said toggles, said toggles capable of being moved at least to the in line position to lock said mechanism by the direct resistance of both of said toggle links against operation from the other handle.

11. A door locking mechanism having a handle on each side of said door for operating said mechanism from either side, means for connecting said handles to said mechanism including, a pair of toggle arms, connections for actuating said toggles by one of said handles, said toggles capable of being moved at least to the in line position to lock said locking mechanism against operation from the other handle by the direct resistance of both of said toggle links, said toggles including a lost motion connection so that they will not become locked when the non toggle actuating handle at the other side of the door is operated.

12. A device for simultaneously locking a plurality of vehicle doors, said device including a power transmitting unit extending across the vehicle in front of said doors and intermediate the upper and lower edges thereof and extending through the hinged edge of said doors, means for controlling said power transmitting element from the interior of said vehicle and other means for controlling said power transmitting element from the exterior of said vehicle.

13. A construction for motor vehicles comprising two or more doors, means for locking simultaneously said doors, means accessible only from inside the vehicle when the vehicle is closed for operating the locking means to lock and unlock the doors, means accessible from outside the vehicle when the vehicle is closed for operating the locking means to lock and unlock the doors, and mechanism to prevent the first means from being operated to unlock the doors when the second means is in locking position.

14. A construction for motor vehicles comprising a plurality of doors, locks for said doors, two independently operable means for actuating said locks to lock and unlock the doors simultaneously, and devices for preventing the unlocking of the doors by one of said means when the other means is in locking position.

15. A construction for motor vehicles comprising a plurality of doors, means operable only from inside a closed vehicle for locking and unlocking said doors, means operable from outside the closed vehicle for locking and unlocking said doors, and mechanism for rendering each of said means respectively inoperative to unlock the doors when the other means is in locking position.

16. A construction for motor vehicles comprising two or more doors, means operable only from inside a vehicle when the vehicle is closed for locking and unlocking said doors, means operable from outside the vehicle when the vehicle is closed for locking and unlocking said doors, and mechanism for preventing the unlocking of the doors by said first means when said second means is in locking position.

17. A construction for motor vehicles comprising a door, a locking device for said door operable from inside the vehicle, a second door, a locking device for the second door operable from outside the vehicle and means for preventing the unlocking of the first door from inside the vehicle when the second door has been locked from outside the vehicle.

18. A construction for motor vehicles comprising a plurality of doors, means for simultaneously locking said doors operable from the inside of the vehicle, another door, a locking device for said door operable from outside the vehicle and means for preventing the unlocking of said first doors from the inside of the vehicle when the last door has been locked from the outside of the vehicle.

19. In an enclosure having a plurality of doors with at least two opposed doors, lock bolt means associated with each of said doors, a latch means for at least one of said doors, means for operating said latch means to latch and unlatch said door, means interconnecting all of said lock bolt means whereby they can be operated to door locked position in unison, control means for said interconnecting means, and means connecting said control means to said latch operating means so that said latch operating means may be operated to move said lock bolt means to door latched position in unison.

20. In an enclosure having a plurality of doors with at least two opposed doors, lock bolt means associated with each of said doors, a latch means for at least one of said doors, means for operating said latch means to latch and unlatch said door, means interconnecting all of said lock bolt means whereby they can be operated to door locked position in unison, control means for said interconnecting means, and means connecting said control means to said latch operating means so that said latch operating means may be operated to move said lock bolt means to door latched position in unison, said latch operating means being operable to actuate said lock bolt means to unlocked condition while said latch means remains in latched condition.

21. In an enclosure having a plurality of doors, lock means associated with one of said doors, means for operating said lock means to lock and unlock said one door, lock means associated with another of said doors, means connecting said last mentioned lock means for actuation by said lock operating means whereby said lock operating means may be moved to lock and unlock said other door, said lock operating means being operable to actuate said lock means for said other door to unlocked condition while said first mentioned lock means remains in locked condition.

22. In a vehicle body having a front door, a rear door, and a pillar intermediate said doors, the combination with a first locking element carried by said rear door and a second locking element carried by said pillar cooperable with said first locking element to retain said rear door in closed position, of manually operable means carried by said body and associated with said locking elements for releasing the latter from cooperative relation to each other, said second locking element being covered by said front door in the closed position of the latter.

BROOKS WALKER.

Patent No. 2,158,736                                                  Granted May 16, 1939

BROOKS WALKER

The above entitled patent was extended July 24, 1951, under the provisions of the act of June 30, 1950, for 6 years and 214 days from the expiration of the original term thereof.

*Commissioner of Patents.*